(12) United States Patent
Tomko et al.

(10) Patent No.: US 6,191,213 B1
(45) Date of Patent: *Feb. 20, 2001

(54) PENETRATING STAINS AND SEALANTS FROM POLYURETHANE DISPERSIONS

(75) Inventors: Revathi R. Tomko, North Olmsted; Barbara J. Varone, Munroe Falls; Robert A. Martuch, Parma, all of OH (US)

(73) Assignee: The Sherwin-Williams Company, Cleveland, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/973,566

(22) PCT Filed: Jun. 6, 1996

(86) PCT No.: PCT/US96/09310

§ 371 Date: Dec. 5, 1997

§ 102(e) Date: Dec. 5, 1997

(87) PCT Pub. No.: WO96/40447

PCT Pub. Date: Dec. 19, 1996

(51) Int. Cl.$^7$ .............................. C08J 3/00; C08K 3/20; C08L 75/00; B05D 3/02

(52) U.S. Cl. .................... 524/591; 524/539; 524/839; 524/840; 427/372.2; 427/385.5; 427/393; 427/393.6

(58) Field of Search .................. 524/539, 591, 524/839, 840; 427/372.2, 385.5, 393, 393.6

(56) References Cited

U.S. PATENT DOCUMENTS 5,023,309 * 6/1991 Kruse et al. ........................ 528/49
5,310,780 * 5/1994 Tomko et al. ..................... 524/591

FOREIGN PATENT DOCUMENTS

| 0 682 049 A1 | 11/1995 | (EP) | C08G/18/12 |
| 2148550 | 11/1995 | (CA) | C08G/18/34 |
| WO 92/18558 | 10/1992 | (WO) | C08J/3/00 |

* cited by examiner

*Primary Examiner*—Patrick D. Niland
(74) *Attorney, Agent, or Firm*—Paul R. Katterle; Robert E. McDonald; Vivien Y. Tsang

(57) ABSTRACT

Low VOC penetrating compositions for staining and protecting porous substrates such as wood, concrete, cement, brick and the like, comprising aqueous dispersions of polyurethane-ureas.

32 Claims, No Drawings

PENETRATING STAINS AND SEALANTS FROM POLYURETHANE DISPERSIONS

BACKGROUND OF THE INVENTION

The present invention relates to an improvement in the area of polyurethane dispersion resins and an improvement in the penetrating stains/sealants art. The improvement comprises the addition of an active-hydrogen containing composition having only one active-hydrogen and also having a long aliphatic chain, such as an alcohol or a monoamine than contains a C6 or greater aliphatic chain, as part of the prepolymer reaction mixture. This composition reacts with the isocyanate groups during the formation of the prepolymer. As a result, the prepolymer has both isocyanate functionality and contains a hydrophobic end group. The prepolymer is neutralized, dispersed in water and chain extended to a composition that penetrates into porous substrates and exhibits excellent water repellency due to the inclusion of the hydrophobic aliphatic end group. Introducing long hydrophobic end groups imparts excellent water resistance and beading characteristics, even to a low molecular weight dispersion polymer. Such low molecular weight polymers would otherwise be expected to show early water sensitivity.

Finishes which are useful on porous substrates such as wood, concrete, cement, brick and the like typically fall into two broad classifications: surface coatings and penetrating finishes. Surface coatings can be very high molecular weight, can be highly crosslinked, and characteristically form a continuous film over the substrate. Varnishes and polyurethane clearcoats are typically classified as surface coatings.

Penetrating finishes, on the other hand, are designed to protect a substrate, and typically change a substrate's color, yet retain the natural textural appearance of the substrate. Penetrating pigmented stains, non-pigmented wood preservatives, and water sealants are typical examples of penetrating finshes. One key attribute of penetrating finishes is that they are designed so as not to form an appreciable surface film or coating on the wood/substrate. They are typically low in molecular weight and very small particle size. They are durable, well suited for textured, exposed surfaces such as siding, decks, steps and the like, can contain water repellants, and are easily applied. The ability to penetrate into the surface without leaving a significant or appreciable film on the surface virtually eliminates the peeling and cracking that varnishes and surface coatings experience.

Penetrating finishes can be further subdivided as clear systems or colored systems. The clear systems typically contain a water repellant. When applied to a wood or porous substrate, these compositions serve to protect the substrate from moisture. In addition to their protective characteristics, the colored systems are designed to change the color of the wood or porous surface without hiding the grain or texture of the substrate.

This invention is directed to penetrating finishes, particularly, penetrating stains and water sealants. In the past, commercial architectural penetrating stains and water sealants have been formulated from oil-based compositions. Many commercially available wood stains still utilize pure linseed oil. Oil-based compositions are relatively inexpensive and provide good spreading characteristics. However, such stains typically lack good abrasion resistance and good drying characteristics. They are, furthermore, typically very high in volatile organic compounds content (VOC).

With the advent of environmental laws and regulations controlling the maximum amounts of VOC permitted in paints, coatings, stains, sealants and the like, numerous attempts have been made in the prior art to formulate penetrating stains which comply with the VOC requirements.

For example, European Patent Application 0 314 378 A1 to Adkins discloses a waterbome alkyd deck stain containing a medium-long oil length water-reducible alkyd resin solubilized in water with the use of propylene glycol tertiary butyl ether as a coupling solvent. Adkins claims to have low VOC, good resistance to water, durability to abrasion and the like.

Likewise, U.S. Pat. No. 4,276,329 to Vasishth et al. discloses a composition for treating and protecting wood surfaces comprising a low molecular weight alkyd resin in a cosolvent of water and glycol ether.

U.S. Pat. No. 4,432,797 to Vasishth et al. discloses a water based thickened stain containing a film forming resin, pigment, thickener and water. The resin is taught to be either an alkyd, a water based acrylic or a water solution of a modified polysaccharide polymer.

UK Patent Application 2 215 732 A to Timperley discloses a water based wood staining composition comprising a water soluble acrylic resin and a pigment.

UK Patent 1 589 605 to Gorivaerk disclose a method of preparing a penetrating wood stain of a suspension of finely divided solids in an oil-in-water emulsion.

U.S. Pat. No. 5,310,780 relates to previous work of one of the present inventors. The present invention represents a substantial improvement over the '780 patent. The improvement comprises the addition of an active-hydrogen containing composition, containing only one active hydrogen and also containing a long aliphatic chain, such as an alcohol or a monoamine containing a C6 or greater aliphatic chain, as part of the prepolymer reaction mixture.

U.S. Pat. No. 5,354,807 to Dochniak discloses anionic water dispersed polyurethane polymers that comprise the reaction product of a polyisocyanate, an active-hydrogen containing compound such as a polyol and a diamine monomer containing a pendant aliphatic.

SUMMARY OF THE INVENTION

The present invention relates to low VOC, penetrating compositions for staining and protecting porous surfaces such as wood, concrete, cement, brick and the like. In particular, this invention relates to stable dispersions of polyurethane-ureas in water which are lower molecular weight, small particle size and which can penetrate into the surface to be coated. The dispersions of this invention are particularly useful as environmentally compliant penetrating stains and water sealants. The present invention relates to an improvement in the area of polyurethane dispersion resins and an improvement in the penetrating stains/sealants art. The improvement comprises the addition of an active-hydrogen containing composition having only one active hydrogen and also having a long aliphatic chain, such as an alcohol or a monoamine containing a C6 or greater aliphatic chain, as part of the prepolymer reaction mixture. This composition reacts with the isocyanate groups during the formation of the prepolymer. As a result, the prepolymer has both isocyanate functionality and contains some hydrophobic end groups. The prepolymer is neutralized, dispersed in water and chain extended to a composition that penetrates into porous substrates and exhibits excellent water repellency due in part to the inclusion of the hydrophobic aliphatic end group.

The present invention relates to low VOC stable, small particle size dispersions of polyurethane-ureas in an aqueous solvent which are especially suitable as penetrating stains and water sealants. The dispersions of this invention have excellent abrasion resistance, shelf stability, penetration into porous surfaces and UV light stability. These dispersions are particularly suited for use, either alone or with additional ingredients such as pigments, waxes and the like, as penetrating stains and water sealants. The polyurethane-ureas of this invention are very low in molecular weight yet are not water sensitive. The compositions of this invention are different from surface coatings and paints in that they do not form an appreciable film when applied over a porous substrate such as wood, concrete, cement, brick and the like.

DETAILED DESCRIPTION OF THE INVENTION

The compositions of this invention are penetrating stains and water sealants which comprise low VOC, stable dispersions of small particle size polyurethane-ureas in an aqueous media. Preferably, the particle size of the polyurethane-urea molecules is less than about 0.4 micron, and most preferably in the range of about 0.1 to about 0.3 micron. The polyurethane-ureas are low in molecular weight. Prior to dispersion in water, the polyurethane-urea intermediates have a weight average molecular weight generally less than about 10,000. When dispersed in an aqueous media, the polyurethane-ureas have a theoretical free isocyanate functionality of zero and a weight average molecular weight generally less than about 50,000.

The compositions of this invention are produced by first reacting two active-hydrogen containing compositions with a diisocyanate-functional material. One of the active-hydrogen containing compositions is preferably difunctional with respect to isocyanate groups. The other active-hydrogen containing composition is monofanctional with respect to isocyanate groups and must also contain an aliphatic chain of C6 or greater.

The difunctional active-hydrogen containing composition is preferably selected from the group consisting of diols such as 1) polyester diols formed from the reaction of saturated and unsaturated polyhydric alcohols such as ethylene glycol, propylene glycol, neopentyl glycol, 1,4-butanediol, 1,4-butenediol, 1,6-hexanediol, furan dimethanol, and cyclohexane dimethanol, with saturated and unsaturated polycarboxylic acids and derivatives thereof such as maleic acid, fumaric acid, itaconic acid, succinic acid, glutaric acid, adipic acid, isophthalic acid, terephthalic acid, phthalic anhydride, dimethyl terephthalate, dimer acids and the like;

2) polyesters formed by the reaction of lactones, such as caprolactone, with a diol;

3) polyether diols such as the products of the polymerization of a cyclic oxide such as ethylene oxide, propylene oxide or tetrahydrofuran;

4) polyether diols formed by the addition of one or more cyclic oxides to water, ethylene glycol, propylene glycol, diethylene glycol, cyclohexane dimethanol, glycerol, or Bisphenol A;

5) polycarbonate diols such as the reaction product of 1,3-propanediol, 1,4-butanediol, 1,6-hexanediol, diethylene glycol or tetraethylene glycol with diaryl carbonates such as diphenyl carbonate or phosgene;

6) polyacetal diols such as the reaction product of a glycol such as diethylene glycol, triethylene glycol or hexanediol with formaldehyde;

7) low molecular weight diols such as dihydroxyalkanoic acids including dimethylolpropionic acid; and mixtures thereof. Other difunctional active hydrogen containing compositions are also suitable for use herein. For example, active hydrogens include hydrogen atoms attached to oxygen, nitrogen or sulfur, and thus, in addition to the polyols disclosed above, compounds such as diamines, aminoalcohols, and mercapto-terminated derivatives thereof, are also useful. Representative materials include the difunctional materials disclosed in U.S. Pat. No. 5,354,807 which is incorporated herein by reference. To the extent that U.S. Pat. No. 5,354,807 teaches materials having functionality greater than two, those materials are not preferred herein as they create a crosslinked, non-linear polymer which is not preferred for use as a penetrating stain, water repellent or preservative.

The diisocyanate-functional material is selected from the group of aromatic, cycloaliphatic or aliphatic diisocyanates, preferably selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, Desmodur W™ (a 4,4'-dicyclohexylmethane diisocyanate available from Mobay), benzene 1,3-bis (1-isocyanato-1-methylethyl)[m-TMXDI], and mixtures thereof.

Also present during the formation of the prepolymer is an active-hydrogen containing composition that is monofunctional with resepect to isocyanates and which contains a long aliphatic chain, preferably a C6 or greater aliphatic chain, more preferably a C12 to C22 aliphatic chain. The amount of such material should be such that from about 1% to about 50% of the total active-hydrogen functionality is contributed by the monofunctional composition. Representative monofunctional compositions include the alcohols, mercaptans and monoamines having C6 or greater aliphatic chains such as hexyl, soya, tallow, hydrogenated tallow, stearyl, coco, lauryl, and oleyl alcohol, mercaptan, amine and mixtures thereof.

Optionally, and preferably present during the reaction is up to about 0.06%, preferably between about 0.01 % and about 0.04% (by weight based upon total solids of active-hydrogen containing compositions and diisocyanate) of a catalyst such as di-butyl tin dilaurate, tin octoate and the like.

During the preparation of the prepolymer, the preferred ratio of total active-hydrogen containing materials to diisocyanate should be such that there is an excess of isocyanate functionality over active-hydrogen functionality. Preferably, the ratio of equivalents of NCO to total active-hydrogen should be between about 1.01:1 to about 2.0:1; preferably between about 1.01:1 to about 1.5:1. Of the active-hydrogen containing materials, from about 1% to about 50% (of the equivalents of materials reactive with NCO) should be contributed by the monofunctional composition.

To ensure that the polyurethane-urea intermediate is dispersible in an aqueous media, it is essential that a percentage of the total polymer weight solids, preferably between about 1% and about 10%, is contributed by active-hydrogen containing compositions having the ability to contribute ionic or hydrophilic groups to the polyurethane-urea. For example, diols, amines and/or epoxies containing carboxylic acid groups, sulfonic acid groups, phosphoric acid groups, ammonium salts, phosphonium salts or sulfonium salts.

The prepolymer preparation reaction is typically carried out by charging the difunctional active-hydrogen containing composition with the catalyst to a reaction vessel, heating the contents to a temperature of between about 85° C. and about 100° C., and adding, via continuous or stepwise addition over a period of time, preferably between about ½ hour to about 1.5 hours, the diisocyanate-functional materials. Optionally present can be a solvent such as n-methyl pyrolidinone, dimethyl formamide, methyl ethyl ketone, toluene, and mixtures thereof in an amount ranging up to about 20% by weight based upon the total weight of the materials present in the reaction vessel. After complete addition of the diisocyanate materials, the reaction vessel temperature is maintained between about 90° C. and 100° C. for approximately 3 to 4.5 hours. Residual isocyanate percentage can be measured by any means well known in the art. The monofunctional active-hydrogen containing composition is then added at 80° C. over a 15 minute period. The reaction mixture is held at 90° C. to 100° C. for another ½ to 1.5 hours. The prepolymer is then poured into water containing a weak base neutralization agent, such as triethylamine, trimethylamine, triisopropyl amine, tributyl amine, triethylene diamine (e.g. DABCO™, commercially available from Air Products Co.), N,N-dimethyl-cyclohexyl amine, N,N-dimethylstearyl amine, N,N-dimethyl aniline, N-methylmorpholine, N-ethylmorpholine, N-methylpiperazine, N-methylpyrolidine, N-methylpiperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine, 2-(2-dimethylaminoethoxy)-ethanol and 5-diethyl-amino-2-pentanone and mixtures thereof, and dispersed. Most preferred are the tertiary amines as they are not reactive with the free isocyanate groups. The amount of weak base added should be sufficient to neutralize at least about 80% of the ionic groups present in solution. Preferably, the weak base is added in an amount sufficient to neutralize 100% of the ionic groups. The weak base can be added in excess, that is, an amount greater than that necessary to neutralize the ionic groups.

The intermediate at this point has a weight average molecular weight less than about 10,000. The monofunctional active-hydrogen containing composition has end-capped many of the NCO groups so that the prepolymer also has some long chain aliphatic hydrophobic endcaps.

The percentage of solids in the water or aqueous solvent can range from between about 20% by weight to about 60% by weight, preferably between about 30% to 50% by weight.

A difunctional amine compound such as ethylene diamine, propylene diamine, butylene diamine, hexamethylene diamine, cyclohexylene diamine, piperazine, hydrazine, mixtures thereof, equivalents thereof and the like in an amount sufficient to react with up to about 90% of the theoretical amount of residual NCO functionality can optionally be included in the dispersing media for chain extension of the polyurethane. Amounts of chain extender higher that this tend to create dispersions having molecular weights which are unacceptably high for use as penetrating stains and water sealants on porous substrates. Chain extenders having a functionality greater than two should not be included in any appreciable amount due to their tendency to cause unacceptably high levels of branching, whereby the composition then acts as a film-forming polymer rather than a penetrating composition when applied to wood or another porous substrate.

Preferably, most of the active-hydrogen containing ingredients are either—difunctional or monofunctional with respect to isocyanates. A minor amount of the total number of equivalents can be contributed by higher-functional materials such as trimethylolpropane; however, an appreciable percentage of such materials is not desired as this results in an intermediate, and thus a final polymer, which exhibits high molecular weight and extensive branching.

The most preferred difunctional active-hydrogen containing starting materials are a combination of 1) the polyester diols formed from the reaction of saturated and unsaturated dihydric alcohols such as ethylene glycol, propylene glycol, neopentyl glycol, 1,4-butanediol, 1,4-butenediol, 1,6-hexanediol, furan dimethanol, and cyclohexane dimethanol with saturated and unsaturated polycarboxylic acids such as maleic acid, fumaric acid, itaconic acid, succinic acid, glutaric acid, adipic acid, isophthalic acid, terephthalic acid, phthalic anhydride, dimethyl terephthalate, dimer acids and the like; and 2) a diol containing hydrophilic groups. One such preferred polyester diol is Rucoflex™ 1015-120 (a mixture of polyester diols based on neopentyl glycol, hexanediol and adipic acid, commercially available from Ruco Polymer Corporation). A particularly preferred diol containing hydrophilic groups is dimethylolpropionic acid. When used, these two diols are preferably present in percentages such that the Rucoflex material contributes between about 40% to about 70% of the OH functionality of the total materials. As the examples below demonstrate, a preferred embodiment comprises Rucoflex 1015-120, trimethylolpropane, dimethylolproprionic acid and cyclohexane dimethanol.

The isocyanate-functional materials are most preferably exclusively diisocyanates selected from the group consisting of Desmodur W™ (4,4'-dicyclohexylmethane diisocyanate), m-TMXDI (benzene 1,3-bis (1-isocyanato-1-methylethyl)), IPDI (isophorone diisocyanates) and mixtures thereof. Most preferred is a combination of Desmodur W™ and m-TMXDI.

As with the active-hydrogen containing materials, a minor percentage of the isocyanate-functional materials can have a functionality greater than two, however, for the same reasons, an appreciable percentage of such isocyanate ingredients is not acceptable due to the effect on molecular weight and chain branching of both the intermediate and the final product. When a mixture of two or more diisocyanates is used, the ratio of NCO equivalents contributed by the individual isocyanates is not critical.

The dispersing media is preferably water. Preferred is water with a small percentage of diamine present or added for chain extension with the residual NCO. The amount of dispersing media should be between about 40% and about 80% by weight of total reaction ingredients. More preferably, the percentage of dispersing media is between about 50% and 80% by weight. When a chain extension agent is used, it should preferably be present or added in an amount sufficient to react with up to about 90% of the residual NCO functionality. The final, chain-extended dispersion, should have a weight average molecular weight less than about 50,000.

Once dispersed into the dispersing media, the composition can be modified with other standard ingredients commonly used to formulate penetrating stains, wood preservatives and water sealants. For example, the dispersions of this invention can be combined with other ingredients such as pigments, colorants, paraffins, waxes, UV light stabilizers, rheology modifiers, mildewcides, biocides, fungicides, and other conventional additives to form excellent penetrating stains, preservatives and/or sealants for wood, concrete, cement, brick and other porous architectural surfaces. Colorants and pigment dispersions, when used, are typically added in amounts up to about 15% by volume of the total composition. Paraffin and ethylene waxes, used to impart water resistance to penetrating finishes, when used, are typically added in amounts up to about 2–3% by weight of the total composition.

In one embodiment of this invention, a surface tension modifying ingredient can be added to the composition to lower the surface tension of the carrier. It has been found that such a surface tension modifying ingredient can enable the composition to more easily penetrate into the porous substrate to which it is applied. Suitable solvents for use as surface tension modifying ingredients include the 2,2,4-trimethyl-alkyl diol monoisobutyrate solvents available from Eastman Chemical marketed under the Texanol™ brand name, glycols such as ethylene glycol, propylene glycol, dipropylene glycol, and the like, glycol ethers such as 2-butoxy ethanol (Butyl Cellosolve), diethylene glycol monobutyl ether (Butyl Carbitol™), and the like, and alcohols such as methanol, ethanol, propanol and the like; and mixtures thereof. Generally, the surface tension modifying agent should be included in an amount sufficient to lower the surface tension of the carrier to a level where the composition will achieve the desired penetration into the porous substrate. Typically, the amount of surface tension modifying agent required is from between about 0.25% to about 5.0% by volume based upon the total volume of the composition. However, it should be appreciated that many standard stain and sealant additives are commercially available in a media which imparts some surface tension modifying activity. In particular, it should be appreciated that many commercially available rheology modifiers are sold in glycol and glycol ether media. The media may contribute some surface tension modifying properties. For example, the Rheolate™ materials are commercially available in a butyl carbitol media. Additionally, some mildewcides and fungicides are commercially available in petroleum distillate media. These media additionally may impart some surface tension modifying characteristics. In general, media which would be expected to impart surface tension modifying activity and which are present in an appreciable amount should be included when calculating the total percentage of surface tension modifying agents.

The following examples demonstrate acceptable methods of preparation of the compositions of this invention. The examples are intended to be representative of the formulations which can be made and are not intended to limit the scope of the invention.

EXAMPLE I

PREPARATION OF THE DISPERSION

Charge 120.0 g of n-methyl pyrolidinone, 496.56 g of Rucoflex 1015-120 (1.09 eq of OH), 80.0 g of dimethylolpropionic acid (1.19 eq of OH), 15.0 g of trimethylolpropane (0.33 eq of OH), 20.0 g of 1,4-cyclohexane dimethanol (0.27 eq of OH) and 3.0 g of dibutyl tin dilaurate (10% solution in n-methyl pyrolidinone) to a reaction vessel equipped with a nitrogen blanket. Begin stirring and increase temperature to about 85.5° C. Begin a 30–40 minute addition of 647.13 g of m-TMXDI (5.3 eq of NCO). Hold for 3.5 to 4 hours then add 110.0 g of soya primary amine (0.40 eq of NH3) over a 15 minute period and hold the reaction under these conditions for 30 to 60 minutes. Disperse the resultant material into 2404 g of water containing 54.2 g of triethylamine to neutralize the ionic groups and 49.3 g of ethylene diamine chain extender.

The above dispersion has approximate $M_n$ of 3338, $M_w$ of 22,813 and $M_z$ of 45,073 (all by gel permeation chromatography). Dispersions prepared according to the above generally have the following characteristics:

Molecular weight: <50,000 (wt. ave)

Particle Size: <0.3 micron

EXAMPLE II

WOOD STAIN

The following represents a typical penetrating semitransparent stain composition using the polyurethane dispersion of Example I to which standard commercially available tinting colorants and pigment dispersions may be added.

| | |
|---|---|
| Water | 381.23 g |
| Dispersion of Example I | 385.41 |
| Defoamer 912 | 1.00 |
| Min-u-gel 400 Attapulgite Clay | 9.00 |
| Triton CF-10 Surfactant N-332 | 4.00 |
| Tinuvin UV Absorber 1130 | 4.04 |
| Tinuvin 292 | 2.70 |
| Polyphase P-20T | 21.5 |
| Minex 4 nepheline syenite | 25.0 |
| Michemlube 511 Wax | 11.49 |
| Proxcel Biocide | 0.40 |
| | 845.77 g |

EXAMPLE III

WATER SEALANT

The following represents a typical, non-pigmented water sealant composition using the polyurethane dispersion of Example I.

| | |
|---|---|
| Water | 614.11 g |
| Dispersion of Example I | 205.87 |
| 2-butoxy ethanol | 16.68 |
| Michemlube 511 Wax | 4.00 |
| 2-amino-2-methyl-1-propanol (pH buffer) | 2.00 |
| Dow Versene 100 | 1.00 |
| | 843.66 g |

In preparing the above water sealant, it is highly preferred to render inactive any metallic ions that might be present in the water and would tend to precipitate out of solution upon addition of the surface tension modifying agent.

What is claimed is:

1. A penetrating composition comprising a dispersion of a polyurethane-urea in an aqueous media having a particle size diameter of less than about 0.4 micron;
   wherein the polyurethane-urea comprises the dispersion in an aqueous media of the reaction product of:
   i) at least two active-hydrogen containing compounds with
   ii) at least one diisocyanate-functional material;
   wherein the reaction between i) and ii) takes place in the presence of between about 0.01% to about 0.06% by weight of a catalyst; wherein one of the active-hydrogen containing compounds is difunctional with respect to isocyanate groups; wherein one of the active-hydrogen containing compounds is monofunctional with respect to isocyanate groups and also contains a C6 or greater aliphatic chain; wherein the ratio of i) to ii) is such that the ratio of isocyanate functionality to total active-hydrogen functionality is in the range of between about 1.01:1 to about 2.0:1; wherein between about 1% to about 50% of the molar equivalents of the total active-hydrogen functionality is contributed by the monofunctional active-hydrogen containing compound; wherein between about 1% and about 10% of the total polymer weight solids is contributed by active-hydrogen containing compounds having the ability to contribute ionic or hydrophilic groups to the polyurethane-urea; and wherein the reaction product of i) and ii) is at least about 80% neutralized with a weak base prior to dispersion in said aqueous media.

2. The composition of claim 1 wherein the difunctional active-hydrogen containing compound is selected from the group consisting of:
   a) polyester diols formed from the reaction of saturated and unsaturated dihydric alcohols with saturated and unsaturated polycarboxylic acids and derivatives thereof;
   b) polyesters formed by the reaction of lactones with a diol;
   c) polyether diols resulting from the polymerization of a cyclic oxide;
   d) polyether diols formed by the addition of one or more cyclic oxides to water, ethylene glycol, propylene glycol, diethylene glycol, cyclohexane dimethanol, glycerol, or Bisphenol A;
   e) polycarbonate diols resulting from the reaction of 1,3-propanediol, 1,4-butanediol, 1,6-hexanediol, diethylene glycol or tetraethylene glycol with diaryl carbonates;
   f) polyacetal diols resulting from the reaction of a glycol with formaldehyde;
   g) low molecular weight dihydroxyalkanoic acids;
and mixtures thereof.

3. The composition of claim 1 wherein the monofunctional active-hydrogen containing compound is selected from the group consisting of hexyl alcohol, hexyl amine, hexyl mercaptan, soya alcohol, soya amine, soya mercaptan, tallow alcohol, tallow amine, tallow mercaptan, hydrogenated tallow alcohol, hydrogenated tallow amine, hydrogenated tallow mercaptan, stearyl alcohol, stearyl amine, stearyl mercaptan, coco alcohol, coco amine, coco mercaptan, lauryl alcohol, lauryl amine, lauryl mercaptan, oleyl alcohol, oleyl amine, oleyl mercaptan and mixtures thereof.

4. The composition of claim 1 wherein the diisocyanate-functional material is selected from the group consisting of tetramethylene diisocyanate, hexamethylene diisocyanate, 2,4-toluene diisocyanatt, 2,6-toluene diisocyanate, 4,4'-diphenylmethane diisocyanate, isophorone diisocyanates, 4,4'-dicyclohexylmethane diisocyanate, benzene 1,3-bis (1-isocyanato-1-methylethyl), and mixtures thereof.

5. The composition of claim 1 wherein the catalyst is selected from the group consisting of di-butyl tin dilaurate, tin octoate and mixtures thereof.

6. The composition of claim 2 wherein the diisocyanate-functional material is selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, 4,4'-dicyclohexylmethane diisocyanate, benzene 1,3-bis (1-isocyanato-1-methylethyl), and mixtures thereof.

7. The composition of claim 6 wherein the catalyst is selected from the group consisting of di-butyl tin dilaurate, tin octoate and mixtures thereof.

8. The composition of claim 1 wherein between about 1% and about 10% by weight of the total polymer weight solids is contributed by diols, amines and/or epoxies having the ability to contribute ionic or hydrophilic groups to the polyurethane-urea.

9. The composition of claim 8 wherein said diols, amines and/or epoxies contain carboxylic acid groups, sulfonic acid groups, phosphoric acid groups, ammonium salts, phosphonium salts or sulfonium salts.

10. The composition of claim 1 further comprising a diamine chain extender in an amount sufficient to react with up to about 90% of the theoretical amount of residual NCO functionality.

11. A method of applying a waterborne, penetrating composition to a porous substrate comprising applying to the surface of a porous substrate a waterborne penetrating composition which penetrates into said substrate and does not form an appreciable film on said substrate, said waterborne penetrating composition comprising an aqueous dispersion of a polyurethane-urea having a particle size diameter of less than about 0.4 micron;
   wherein the polyurethane-urea comprises the dispersion in an aqueous media of the reaction product of:
      i) at least two active-hydrogen containing compounds with
      ii) at least one diisocyanate-functional material;
   wherein the reaction between i) and ii) takes place in the presence of between about 0.01% to about 0.06% by weight of a catalyst; wherein one of the active-hydrogen containing compounds is difunctional with respect to isocyanate groups; wherein one of the active-hydrogen containing compounds is monofunctional with respect to isocyanate groups and also contains a C6 or greater aliphatic chain and imparts water resistance to the substrate; wherein the ratio of i) to ii) is such that the ratio of isocyanate functionality to total active-hydrogen functionality is in the range of between about 1.01:1 to about 2.0:1; wherein between about 1% to about 50% of the molar equivalents of the total active-hydrogen functionality is contributed by the monofunctional active-hydrogen containing compound; wherein between about 1% and about 10% of the total polymer weight solids is contributed by active-hydrogen containing compounds having the ability to contribute ionic or hydrophilic groups to the polyurethane-urea; and wherein the reaction product of i) and ii) is at least about 80% neutralized with a weak base prior to dispersion in said aqueous media.

12. The method of claim 11 wherein the substrate is selected from the group consisting of wood, concrete, cement and brick.

13. The method of claim 11 wherein the difunctional active-hydrogen containing compound is selected from the group consisting of:
   a) polyester diols formed from the reaction of saturated and unsaturated di-hydric alcohols with saturated and unsaturated polycarboxylic acids and derivatives thereof;
   b) polyesters formed by the reaction of lactones with a diol;
   c) polyether diols resulting from the polymerization of a cyclic oxide;
   d) polyether diols formed by the addition of one or more cyclic oxides to water, ethylene glycol, propylene glycol, diethylene glycol, cyclohexane dimethanol, glycerol, or Bisphenol A;

e) polycarbonate diols resulting from the reaction of 1,3-propanediol, 1,4-butanediol, 1,6-hexanediol, diethylene glycol or tetraethylene glycol with diaryl carbonates;

f) polyacetal diols resulting from the reaction of a glycol with formaldehyde;

g) low molecular weight dihydroxyalkanoic acids;

and mixtures thereof.

14. The composition of claim 11 wherein the monofunctional active-hydrogen containing compound is selected from the group consisting of hexyl alcohol, hexyl amine, hexyl mercaptan, soya alcohol, soya amine, soya mercaptan, tallow alcohol, tallow amine, tallow mercaptan, hydrogenated tallow alcohol, hydrogenated tallow amine, hydrogenated tallow mercaptan, stearyl alcohol, stearyl amine, stearyl mercaptan, coco alcohol, coco amine, coco mercaptan, lauryl alcohol, lauryl amine, lauryl mercaptan, oleyl alcohol, oleyl amine, oleyl mercaptan and mixtures thereof.

15. The method of claim 11 wherein the diisocyanate-functional material is selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, 4,4'-dicyclohexylmethane diisocyanate, benzene 1,3-bis (1-isocyanato-1-methylethyl), and mixtures thereof.

16. The method of claim 11 wherein between about 1% and about 10% by weight of the total polymer weight solids is contributed by diols, amines and/or epoxies having the ability to contribute ionic or hydrophilic groups to the polyurethane-urea.

17. The method of claim 16 wherein said diols, amines and/or epoxies contain carboxylic acid groups, sulfonic acid groups, phosphoric acid groups, ammonium salts, phosphonium salts or sulfonium salts.

18. The method of claim 11 wherein the waterborne penetrating composition further comprises a diamine chain extender in an amount sufficient to react with up to about 90% of the theoretical amount of residual NCO functionality.

19. A waterborne, penetrating wood stain comprising:

a) an aqueous dispersion of a polyurethane-urea having a particle size diameter of less than about 0.4 micron; wherein the polyurethane-urea comprises the dispersion in an aqueous media of the reaction product of:

i) at least two active-hydrogen containing compounds with ii) at least one diisocyanate-functional material;

wherein the reaction between i) and ii) takes place in the presence of between about 0.01% to about 0.06% by weight of a catalyst; wherein one of the active-hydrogen containing compounds is difunctional with respect to isocyanate groups; wherein one of the active-hydrogen containing compounds is monofunctional with respect to isocyanate groups and also contains a C6 or greater aliphatic chain; wherein the ratio of i) to ii) is such that the ratio of isocyanate functionality to total active-hydrogen functionality is in the range of between about 1.01:1 to about 2.0:1; wherein between about 1% to about 50% of the molar equivalents of the total active-hydrogen functionality is contributed by the monofunctional active-hydrogen containing compound; wherein between about 1% and about 10% of the total polymer weight solids is contributed by active-hydrogen containing compounds having the ability to contribute ionic or hydrophilic groups to the polyurethane-urea; and wherein the reaction product of i) and ii) is at least about 80% neutralized with a weak base prior to dispersion in said aqueous media.

20. The stain of claim 19 wherein the difunctional active-hydrogen containing compound is selected from the group consisting of:

a) polyester diols formed from the reaction of saturated and unsaturated polyhydric alcohols with saturated and unsaturated polycarboxylic acids and derivatives thereof;

b) polyesters formed by the reaction of lactones with a diol;

c) polyether diols resulting from polymerization of a cyclic oxide;

d) polyether diols formed by the addition of one or more cyclic oxides to water, ethylene glycol, propylene glycol, diethylene glycol, cyclohexane dimethanol, glycerol, or Bisphenol A;

e) polycarbonate diols resulting from the reaction of 1,3-propanediol, 1,4-butanediol, 1,6-hexanediol, diethylene glycol or tetraethylene glycol with diaryl carbonates;

f) polyacetal diols resulting from the reaction of a glycol with formaldehyde;

g) low molecular weight dihydroxyalkanoic acids;

and mixtures thereof.

21. The composition of claim 19 wherein the monofunctional active-hydrogen containing compound is selected from the group consisting of hexyl alcohol, hexyl amine, hexyl mercaptan, soya alcohol, soya amine, soya mercaptan, tallow alcohol, tallow amine, tallow mercaptan, hydrogenated tallow alcohol, hydrogenated tallow amine, hydrogenated tallow mercaptan, stearyl alcohol, stearyl amine, stearyl mercaptan, coco alcohol, coco amine, coco mercaptan, lauryl alcohol, lauryl amine, lauryl mercaptan, oleyl alcohol, oleyl amine, oleyl mercaptan and mixtures thereof.

22. The stain of claim 19 wherein the diisocyanate-functional material is selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, 4,4'-dicyclohexylmethane diisocyanate, benzene 1,3-bis (1-isocyanato-1-methylethyl), and mixtures thereof.

23. The stain of claim 19 wherein between about 1% and about 10% by weight of the total polymer weight solids is contributed by diols, amines and/or epoxies having the ability to contribute ionic or hydrophilic groups to the polyurethane-urea.

24. The stain of claim 23 wherein said diols, amines and/or epoxies contain carboxylic acid groups, sulfonic acid groups, phosphoric acid groups, ammonium salts, phosphonium salts or sulfonium salts.

25. The stain of claim 19 further comprising a diamine chain extender in an amount sufficient to react with up to about 90% of the theoretical amount of residual NCO functionality.

26. A waterborne, penetrating water sealant composition comprising:

a) an aqueous dispersion of a polyurethane-urea having a particle size diameter of less than about 0.4 micron; wherein the polyurethane-urea comprises the dispersion in an aqueous media of the reaction product of:

i) at least two active-hydrogen containing compounds with ii) at least one diisocyanate-functional material;

wherein the reaction between i) and ii) takes place in the presence of between about 0.01% to about 0.06% by weight of a catalyst; wherein one of the active-hydrogen containing compounds is difunctional with respect to isocyanate groups; wherein one of the active-hydrogen containing compounds is monofunctional with respect to isocyanate groups and also contains a C6 or greater aliphatic chain; wherein the ratio of i) to ii) is such that the ratio of isocyanate functionality to total active-hydrogen functionality is in the range of between about 1.01:1 to about 2.0:1; wherein between about 1% and about 50% of the molar equivalents of the total active-hydrogen functionality is contributed by the monofunctional active-hydrogen containing compound; wherein between about 1% and about 10% of the total polymer weight solids is contributed by active-hydrogen containing compounds having the ability to contribute ionic or hydrophilic groups to the polyurethane-urea; and wherein the reaction product of i) and ii) is at least about 80% neutralized with a weak base prior to dispersion in said aqueous media; and b) at least one paraffin or wax.

27. The water sealant of claim 26 wherein the difunctional active-hydrogen containing compound is selected from the group consisting of:
  a) polyester diols formed from the reaction of saturated and unsaturated polyhydric alcohols with saturated and unsaturated polycarboxylic acids and derivatives thereof;
  b) polyesters formed by the reaction of lactones with a diol;
  c) polyether diols resulting from the polymerization of a cyclic oxide;
  d) polyether diols formed by the addition of one or more cyclic oxides to water, ethylene glycol, propylene glycol, diethylene glycol, cyclohexane dimethanol, glycerol, or Bisphenol A;
  e) polycarbonate diols resulting from the reaction of 1,3-propanediol, 1,4-butanediol, 1,6-hexanediol, diethylene glycol or tetraethylene glycol with diaryl carbonates;
  f) polyacetal diols resulting from the reaction of a glycol with formaldehyde;
  g) low molecular weight dihydroxyalkanoic acids;
and mixtures thereof.

28. The composition of claim 26 wherein the monofunctional active-hydrogen containing compound is selected from the group consisting of hexyl alcohol, hexyl amine, hexyl mercaptan, soya alcohol, soya amine, soya mercaptan, tallow alcohol, tallow amine, tallow mercaptan, hydrogenated tallow alcohol, hydrogenated tallow amine, hydrogenated tallow mercaptan, stearyl alcohol, stearyl amine, stearyl mercaptan, coco alcohol, coco amine, coco mercaptan, lauryl alcohol, lauryl amine, lauryl mercaptan, oleyl alcohol, oleyl amine, oleyl mercaptan and mixtures thereof.

29. The water sealant of claim 26 wherein the diisocyanate-functional material is selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, 4,4'-dicyclohexylmethane diisocyanate, benzene 1,3-bis (1-isocyanato-1-methylethyl), and mixtures thereof.

30. The water sealant of claim 26 wherein between about 1% and about 10% by weight of the total polymer weight solids is contributed by diols, amines and/or epoxies having the ability to contribute ionic or hydrophilic groups to the polyurethane-urea.

31. The water sealant of claim 30 wherein said diols, amines and/or epoxies contain carboxylic acid groups, sulfonic acid groups, phosphoric acid groups, ammonium salts, phosphonium salts or sulfonium salts.

32. The water sealant of claim 26 further comprising a diamine chain extender in an amount sufficient to react with up to about 90% of the theoretical amount of residual NCO functionality.

* * * * *